United States Patent
Belgardt et al.

(10) Patent No.: US 6,985,435 B1
(45) Date of Patent: Jan. 10, 2006

(54) METHOD FOR EXPANDING THE SWITCHING NETWORK OF A COMMUNICATIONS SYSTEM WITHOUT INTERRUPTING OPERATION

(75) Inventors: Eckhardt Belgardt, Bangalore (IN); Peter Rau, Munich (DE); Klaus Steinigke, Munich (DE); Rudolf Steizl, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/856,064

(22) PCT Filed: Nov. 17, 1999

(86) PCT No.: PCT/DE99/03655

§ 371 (c)(1),
(2), (4) Date: Sep. 6, 2001

(87) PCT Pub. No.: WO00/30300

PCT Pub. Date: May 25, 2000

(30) Foreign Application Priority Data

Nov. 17, 1998 (DE) .............................. 198 53 068

(51) Int. Cl.
*G01R 31/08* (2006.01)
(52) U.S. Cl. ...................... 370/219; 370/217; 370/218

(58) Field of Classification Search ........ 370/217–228, 370/242–245, 248–253, 395.1, 72, 254, 256, 370/465, 468, 471
See application file for complete search history.

(56) References Cited

U.S. PATENT DOCUMENTS

| | | | |
|---|---|---|---|
| 5,325,089 A | * | 6/1994 | Goeldner .................. 340/2.25 |
| 5,802,052 A | | 9/1998 | Venkataraman |
| 6,049,542 A | * | 4/2000 | Prasad ........................ 370/386 |

OTHER PUBLICATIONS

A Scalable ATM Switching System Architecture, Fischer et al., pp. 1299-1307.
Patent Abstracts of Japan—08102749—Apr. 16, 1996.

* cited by examiner

*Primary Examiner*—Chi Pham
*Assistant Examiner*—Viet Le
(74) *Attorney, Agent, or Firm*—Bell, Boyd & Lloyd LLC

(57) ABSTRACT

A method for extending the switching matrix of a communication system without interruption which is effected by reserving space for the routing addresses of the largest extension stage both in the header translation table of the interface devices and in the cell header of each ATM cell, and by providing a system split which is used to replace the old switching matrix assemblies with new switching matrix assemblies in steps, the paths via the new switching matrix assemblies, insofar as they lead to the same output-side interface devices as via the old switching matrix assemblies, being addressable using the same routing addresses.

5 Claims, 1 Drawing Sheet

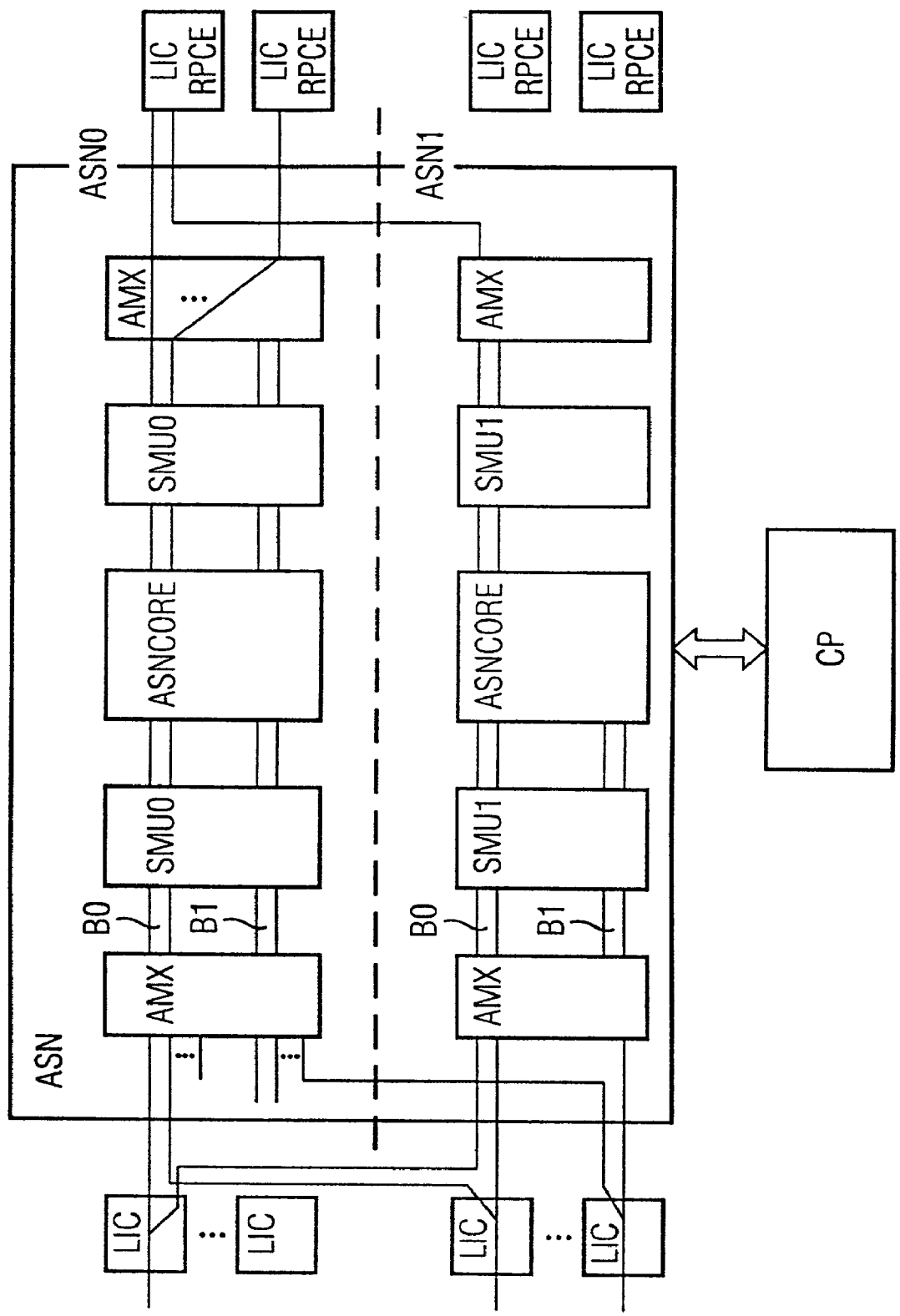

METHOD FOR EXPANDING THE SWITCHING NETWORK OF A COMMUNICATIONS SYSTEM WITHOUT INTERRUPTING OPERATION

BACKGROUND OF THE INVENTION

1. Field of the Invention

The present invention relates to a method for extending a switching matrix of a communication system without interruption, wherein the switching matrix has a number of switching matrix assemblies via which a number of cell streams having ATM cells are routed as stipulated by a routing address placed in front of a cell header, and the routing address taking up a prescribed memory space requirement.

2. Description of the Prior Art

Generally, the switching matrix can be regarded as the central part of a communication system. The switching matrix has a number of assemblies through which the information for all the connections is routed. If the connection capacity of a communication system is to be extended, the switching matrix, as central part, needs to be enlarged in particular. This is particularly true, also, for switching matrices which connect and transmit information packaged in ATM cells.

Contemporary ATM switching matrices are extended by replacing the old switching matrix components with new components. Extension in terms of adding new components to the old components in modular fashion, with the old components being able to be used as previously, is carried out only rarely. The switching matrix therefore generally needs to be completely restructured.

This has consequences both for the operating system and for the path information of the ATM cells which are to be connected. In particular, the routing addresses which show the path to the ATM cell within the switching matrix need to be changed appropriately once the switching matrix has been changed over. During operation of the switching matrix, this cannot be done, or can be done only with great complexity. In the case of this prior art, to extend the switching matrix, operation is therefore interrupted and the switching matrix is completely disconnected. This then allows the switching matrix to be changed over and the routing addresses to be changed.

The document "A Scalable ATM Switching System Architecture", Wolfgang Fischer et al., IEEE Journal of Selected Areas in Communications, 9(1991) October, No. 8, New York, US discloses the architecture of an ATM switching system. Specific measures to be taken in order to add equipment to the switching matrix of the ATM switching system during ongoing operation are not addressed in this case, however.

In addition, US patent specification U.S. Pat. No. 5,325,089 likewise discloses an extendable ATM switching matrix. The extension is described here in detail within the context of how the individual stages need to be wired together. Specific measures to be taken in order to add equipment to the switching matrix of the ATM switching system during ongoing operation without any great complexity are also not addressed in this case.

The present invention is directed to demonstrating a way in which switching matrices can be extended without disrupting operation.

SUMMARY OF THE INVENTION

Accordingly, the present invention involves a method for extending a switching matrix, which is in redundant form, of a communication system without interruption, wherein the switching matrix has a number of switching matrix assemblies which a number of cell streams having ATM cells are routed as stipulated by a routing address placed in front of a cell header, the routing address taking up a prescribed memory space requirement, the method including the steps of: reserving additional memory space for storing the routing address of a largest required switching matrix extension both in a header translation table and in the cell header of each ATM cell by placing at least one zero in front of the routing address; performing a system split which is used to replace old switching matrix assemblies with new switching matrix assemblies in steps; addressing, in the new switching matrix assemblies and insofar as the new switching matrix assemblies connect paths to a same output as the old switching matrix assemblies, the paths using the same routing addresses; and writing the new routing addresses for the paths via the extended switching matrix to the additional memory space.

An advantage of the present invention is, in particular, that sufficient memory space is reserved for the routing addresses. In addition, there is the assurance that the routing addresses of the ATM cells are identical for each switching matrix type. In practice, this results in, at the actual startup of the switching matrix, the routing address always being configured for the largest switching matrix type. The routing addresses for the paths via the new switching matrix assemblies thus remain unchanged from the old ones. As such, existing connections can remain unchanged, and paths via the extended part of the switching matrix which have the already reserved extended routing addresses used for them now need only have the extended routing addresses entered for them in the extended memory space. The switching matrix is then changed over using a system split. Such a procedure has the associated advantage that the changeover can occur during ongoing operation, and existing connections do not need to be terminated.

Additional features and advantages of the present invention are described in, and will be apparent from, the Detailed Description of the Preferred Embodiments and the Drawings.

DESCRIPTION OF THE DRAWINGS

FIG. 1 shows a switching matrix of a communication system which is used in connection with the method of the present invention.

DETAILED DESCRIPTION OF THE PREFERRED EMBODIMENTS

Accordingly, a switching matrix ASN is shown which is split into 2 halves $ASN_0$ and $ASN_1$. In addition, redundantly arranged assemblies AMX, SMU and ASNCORE are shown which respectively form the switching matrix halves $ASN_0$ and $ASN_1$. The assemblies AMX are in the form of ATM multiplexers whose task is to multiplex ATM cell streams onto the devices SMU which follow. The latter execute random multiplex methods, according to the rules of which ATM cells are removed from a memory (not shown in more detail) and are supplied to the devices connected downstream. The devices ASNCORE represent the core of the switching matrix ASN, which is responsible for switching through the connections. The input-side devices AMX, $SMU_0$, ASNCORE of the switching matrix half $ASN_0$ are connected to one another via converged lines $B_0$, $B_1$ in redundant form. The same applies to the output-side devices ASNCORE, $SMU_0$, AMX of the switching matrix half $ASN_0$. The action taken is similar in the case of the connections for the input-side and output-side devices of the switching matrix half $ASN_1$. Arranged on the input and output sides of the switching matrix ASN are interface devices LIC used for receiving and outputting the ATM cells.

The arriving ATM cells are split into 2 identical ATM cell streams in the interface devices LIC and are supplied via the respective input-side devices AMX, SMU, ASNCORE arranged in redundant form to the output-side devices AMX, SMU (which are likewise arranged in redundant form), where they are forwarded via the output-side interface devices LIC. There, an algorithm RPC is executed which decides which of the arriving identical ATM cells is forwarded.

A connection between 2 subscribers is now set up by virtue of a signaling cell first being transmitted from the sending subscriber to the receiving subscriber. In this process, the path which the ATM cells are later to take is stipulated Ascertainment of this path is controlled and stored by a central computer CP. This computer thus has an up-to-date map of all connections.

In addition, routing addresses are stipulated. The routing address stipulates the output port of the switching matrix. If, by way of example, the device AMX arranged on the output side is connected to port 10 of the switching matrix ASN, the routing address contains "10" in this case. On the basis of the routing addresses, the switching matrix ASN automatically "knows" the port to which the ATM cell needs to be routed. The routing address is also part of an internal cell header placed in front of the ATM cell in the interface device LIC.

A cell stream's ATM cells arriving in an input-side interface device LIC are now given the internal cell header which, among other things, stipulates the path through the switching matrix in the form of a routing address. The routing address stipulates the output via which the relevant ATM cell leaves the switching matrix ASN again. In addition, the cell stream is split into 2 redundant cell streams. The two cell streams are then supplied to the relevant output via different paths. The output-side interface device LIC associated with this output receives both cell streams. A Redundant Patch Combining algorithm (RPC) being executed therein then decides which of the redundant ATM cells is supplied to further devices.

In addition, upon startup, all the devices of the communication system are initialized and brought up to speed. These operations are likewise controlled by the central computer CP. In addition, the length of the routing address in the internal cell header is stipulated by the hardware. This length is assigned to the assemblies in a header translation table.

The present invention now provides that, upon startup of the communication system, sufficient memory space is reserved for later extension of the routing address. This is done by placing one or more zeros in front of the actual address.

To change over the switching matrix, a system split is first performed. In this context, one half, e.g. $ASN_0$, of the switching matrix ASN is first disconnected by a software command. The traffic routed via the half $ASN_0$ is then interrupted. The cell streams routed via the second half, associated in redundant form, e.g. $ASN_1$, are forwarded by the algorithm RPC. If the new assemblies of the first half $ASN_0$ have been installed, these new assemblies are tested and activated in steps. As soon as all the assemblies of the first half are active, the traffic is transmitted via both halves again. In this intermediate state, the switching matrix is thus (briefly) operated using a switching matrix half which includes old switching matrix assemblies and a switching matrix half which includes new switching matrix assemblies.

Subsequently, the second half, e.g. $ASN_1$, is then disconnected. The traffic routed via the half $ASN_1$ is then interrupted. The cell streams routed via the first half, associated in redundant form, e.g. $ASN_0$, are forwarded by the algorithm RPC. If the new assemblies of the second half $ASN_1$ have been installed, the assemblies of the second half $ASN_1$ are tested and activated in steps. As soon as all the assemblies of the second half are active, the traffic is transmitted via both halves again.

A fundamental feature is thus that the switching matrix is changed over such that the routing addresses can remain unchanged during extension. To this end, the routing address for a configuration which is of an appropriately small size is allocated as though the small configuration were part of the largest configuration. This is done by virtue of the personnel providing appropriate wiring. The addresses therefore remain the same. The redundancy can therefore be utilized in order to extend the switching matrix with the associated random multiplex unit without interruption.

Although the present invention has been described with reference to specific embodiments, those of skill in the art will recognize that changes may be made thereto without departing from the spirit and scope of the invention as set forht in the hereafter appended claims.

We claim:

1. A method for extending a redundant switching matrix without interruption for a communication system, the switching matrix having a plurality of switching matrix assemblies via which a plurality of cell streams having ATM cells are routed according to a routing address placed in front of a cell header, the routing address taking up a prescribed memory space requirement, the method comprising the steps of:
    reserving additional memory space for storing the routing address of a largest required switching matrix extension both in a header translation table and in the cell header of each ATM cell by placing at least one zero in front of the routing address;
    performing a system split which is used to replace old switching matrix assemblies with new switching matrix assemblies in steps;
    addressing, in the new switching matrix assemblies and insofar as the new switching matrix assemblies connect paths to a same output as the old switching matrix assemblies, the paths using the same routing addresses; and
    writing the new routing addresses for the paths via the extended switching matrix to the additional memory space.

2. A method for extending a switching matrix of a communication system without interruption as claimed in claim 1, wherein the system split is performed by disconnecting half of the old switching matrix and replacing it with a new switching matrix half, the cell streams being routed via a remaining half of the old switching matrix, wherein the disconnected half is then started up again using the new switching matrix, as a result of which one half of the switching matrix is operated using the new switching matrix half and the remaining half is operated using the old switching matrix, wherein the remaining half of the old switching matrix is then disconnected and replaced with another new switching matrix half via which the cell streams are routed, and wherein the remaining half is then started up again using the another new switching matrix.

3. A method for extending a switching matrix of a communication system without interruption as claimed in claim 1, wherein, in input-side interface devices, the cell header of each ATM cell has an internal cell header placed in front of it which is used to hold the routing addresses and is removed again in output-side interface devices.

4. A method for extending a switching matrix of a communication system without interruption as claimed in claim 1, wherein, in input-side interface devices, arriving cell streams are split into two separate and identical cell streams such that a first cell stream is routed via one half of the switching matrix and a second cell stream is routed via the remaining half of the switching matrix to the same output-side interface devices as stipulated by the routing address placed in front of the cell header.

5. A method for extending a switching matrix of a communication system without interruption as claimed in claim 1, wherein the additional memory space is reserved for the largest required switching matrix extension both in the header translation table and in the cell header of each ATM cell.

\* \* \* \* \*